April 29, 1924.
H. J. POCOCK
INTERNAL COMBUSTION ENGINE
Filed Nov. 9, 1920    2 Sheets-Sheet 1
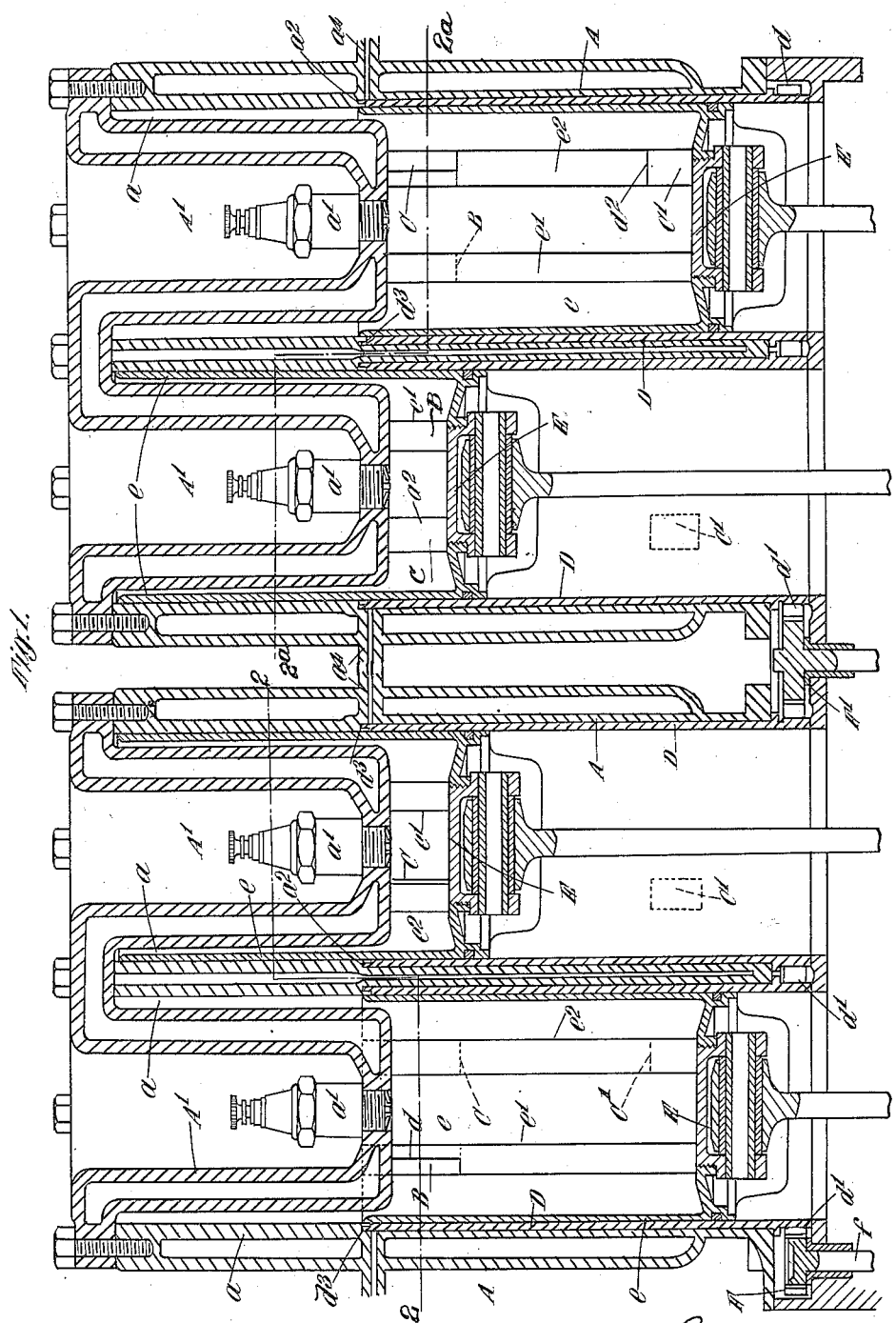

April 29, 1924.
H. J. POCOCK
1,492,263
INTERNAL COMBUSTION ENGINE
Filed Nov. 9, 1920  2 Sheets-Sheet 2
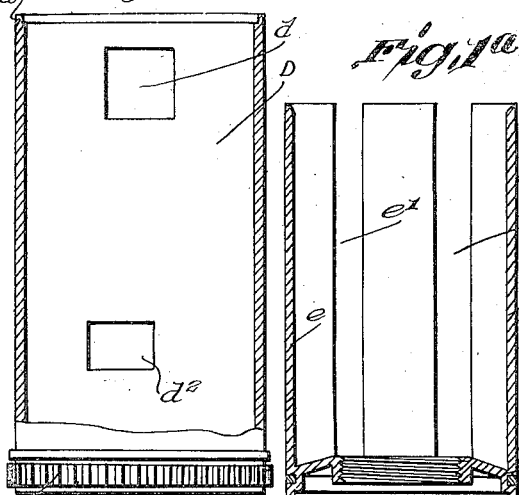
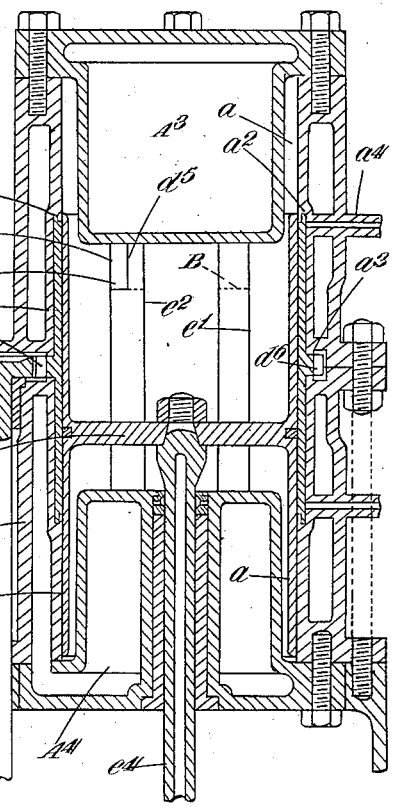
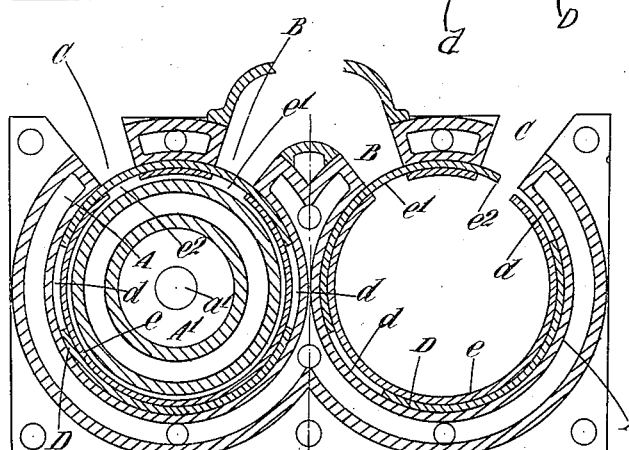
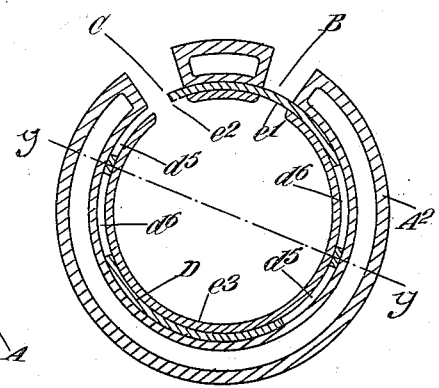

Patented Apr. 29, 1924.

1,492,263

UNITED STATES PATENT OFFICE.

HORACE JAMES POCOCK, OF WEST HAMPSTEAD, LONDON, ENGLAND, ASSIGNOR OF ONE-THIRD TO ERIC HAMILTON ROSE, OF LONDON, ENGLAND, AND ONE-THIRD TO ACHILLE RIVARDE, OF ST. JOHN'S WOODS, LONDON, ENGLAND.

INTERNAL-COMBUSTION ENGINE.

Application filed November 9, 1920. Serial No. 422,870.

*To all whom it may concern:*

Be it known that I, HORACE JAMES POCOCK, a subject of the King of Great Britain, residing at 13 Gladys Road, West Hampstead, in the county of London, England, have invented certain new and useful Improvements in or Relating to Internal-Combustion Engines, of which the following is a specification.

This invention relates to internal combustion engines.

According to this invention the inlet and exhaust are controlled by a rotating sleeve provided with a port or ports and situated between the cylinder wall and a cylindrical cup piston, the cylindrical portion of which is also provided with ports arranged to register with inlet and exhaust ports of the cylinder. The cylinder is preferably recessed to receive the rotating sleeve, which encloses the working space of the cylinder, the inner face of the sleeve being flush with the face of the remaining part of the cylinder. The cylinder extends beyond the working space as a narrow annular channel, formed by an inward projection of the cylinder head and receiving the cylindrical part of the piston during its inward stroke.

The chief object of the invention is to simplify the working of the inlet and exhaust operations and to protect the rotating sleeve, which serves as the inlet and exhaust valve controlling element, from the hot gases of combustion, the cupped piston practically enclosing the combustion space so that the combustion takes place within the piston.

In order that the said invention may be clearly understood and readily carried into effect, the same will now be described more fully with reference to the accompanying drawings, in which:—

Figure 1 is a vertical section through a four cylinder engine illustrating this invention.

Figure 1ª shows in section the cupped piston separately.

Figure 1ᵇ shows a detail view of the rotating sleeve.

Figure 2 is a sectional plan through two cylinders of the engine on the broken line 2—2 of Figure 1.

Figure 2ª is a similar sectional plan of the two cylinders at the left of Figure 1 on the line 2ª—2ª, showing a reversed arrangement of the inlet and exhaust ports.

Figure 3 is a vertical section of a double acting single cylinder engine, and

Figure 4 is a cross section through the cylinder.

A is the engine cylinder having an inlet port B and an exhaust port C. D is the rotating sleeve mounted in the cylinder and provided with the ports $d$, two of which are shown in the plan, Figures 2, 2ª, placed at opposite sides of the sleeve. E is the piston, having a long cylindrical cup portion $e$ provided with longitudinal ports or slots $e^1$ $e^2$ in line with the inlet and exhaust ports B, C of the cylinder A.

Referring to the single acting engine illustrated in Figures 1, 2 and 2ª the complete set of sleeves is driven from the pinion F on the engine driven shaft $f$, the pinion gearing with the toothed ring $d^1$ at the lower edge of the adjacent sleeve. The toothed ring of the first sleeve shown at the left hand side of Figure 1 meshes with the toothed ring of the next sleeve while between the toothed rings belonging to the sleeves of the middle pair of cylinders an intermediate pinion F' is provided which may be an idle pinion or may also be engine driven so that the sleeves of the two middle cylinders are driven in the same direction. The intermediate pinion F' causes the sleeves D of the two middle cylinders to rotate in the same direction so that the arrangement of inlet and exhaust ports B and C in these cylinders is the same, as in the two outer cylinders.

The cylinder heads A' are shown deeply cupped so as to provide narrow annular channels $a$ into which the cylindrical cups $e$ of the pistons can extend, the pistons of the two inner cylinders being shown at about the end of the compression stroke with the cups $e$ projecting to the ends of the channels $a$. The cylinder heads carry the sparking plugs $a'$ at the base of their cupped portions, if the engine is provided with electrical ignition. The sleeves D, if provided with a pair of ports $d$, are driven at quarter engine speed, but if provided with a single port $d$ the sleeves would be driven at half engine speed. The ports $d$ are situated on the same level as the inlet and outlet ports B and C of the cylinders so that when a port $d$ during the rotation of the sleeve D passes across either the inlet or the exhaust port of the cylinder the port is opened to the interior through one of the piston slots or ports $e^1$, $e^2$ which owing to their length always register with the cylinder ports throughout the whole stroke of the piston so that the timing of the opening of the inlet and exhaust is entirely controlled by the rotary sleeve D.

In the single acting engine shown in Figures 1, 2 and 2ª the cylinder may be provided with an auxiliary exhaust port $C^1$ situated towards the outer end of the cylinder and the sleeve D is provided with an auxiliary port $d^2$ which opens the cylinder to exhaust through the port $C^1$ at the outer end of the working stroke, as indicated in the right hand cylinder of Figure 1.

The inner end $d^3$ of the rotating sleeve D is preferably rebated and the shoulder $a^2$ of the cylinder A against which the sleeve abuts is correspondingly rebated, so that the end of the sleeve is positively held in place and the cylinder and sleeve faces are flush. The cylinder head $A^1$, which is water-jacketed, projects as already mentioned a considerable distance into the cylinder, the projecting part being approximately equal to the cupped portion of the piston, so that at the inner end of the stroke the piston head approaches the end of the inwardly extending cylinder head and the cylindrical part of the piston lies almost wholly in the narrow annular channel $a$ between the cylinder head and cylinder, the proportions of the various parts being adjusted to give the desired compression space at the end of the compression stroke.

In a multicylinder engine such as is shown in Figure 1, the various sleeves D are, as already described, geared together and the ports are arranged to give the proper timing for the inlet and exhaust of each cylinder on the sleeves rotate. In the engine illustrated the ordinary four stroke cycle is arranged for, the left hand cylinder being shown at about the end of the inlet stroke of the piston, the second cylinder at the end of the exhaust stroke, the third cylinder at the end of the compression stroke and the fourth cylinder at the end of the working stroke with exhaust through the auxiliary port $C^1$ which is uncovered by the auxiliary sleeve port $d^2$ when the piston E approaches the end of the working stroke, the auxiliary port closing as the piston returns and the remainder of the gases being driven out of the ordinary exhaust port C.

As the two middle and the two outer cylinders respectively have corresponding arrangements of ports B and C, the inlet ports B of the right hand pair of cylinders (Figure 1) shown in Figure 2 are adjacent to each other, and the exhaust ports C (and C') are at opposite sides, whereas the ports C (and C') of the left hand pair of cylinders (Figure 1) shown in Figure 2ª are adjacent, and the inlet ports B are at opposite sides. Otherwise the arrangement of ports is similar throughout the engine.

In the double acting engine shown in Figures 3 and 4 the cylinder $A^2$ is provided with two covers or heads $A^3$, $A^4$ through one of which projects the piston rod $e^4$ belonging to the double acting piston $E^1$. The sleeve $D^1$ is placed intermediate ends of the cylinder bore and is driven through the toothed ring $d^4$ by the engine driven pinion $F^1$. The piston $E^1$ is provided with the two cylindrical cups $e^3$, one on each side, both of which are provided with the vertical slots $e^1$, $e^2$, for inlet and exhaust, these slots being in line with the inlet and exhaust ports B, C of the cylinder $A^2$.

The rotating sleeve $D^1$ is provided at both ends with the ports $d^5$, $d^6$, the ports $d^5$ serving for the inlet and outlet ports B, C of the upper end of the cylinder while the ports $d^6$, which are angularly displaced as regards the ports $d^5$ serve for the inlet and exhaust of the lower end of the cylinder. For convenience of illustration the ports $d^5$, $d^6$ of both upper and lower cylinders are both shown in section in Figure 4, but it is to be understood that the section below $y$—$y$ showing the ports $d^6$ is taken through the lower end of the cylinder and the section above $y$—$y$ showing the ports $d^5$ through the upper end of the cylinder. The angular displacement of the ports $d^5$ and $d^6$ corresponds to the difference in timing required for the inlet and exhaust operations at the two ends of the cylinder, the cycle of operations following the usual course. The water cooled cylinder heads $A^3$, $A^4$ each form the required annular space $a$ to receive the cylindrical cups $e^3$ at the outer end of their respective strokes. The central toothed ring $d^4$ of the rotating sleeve $D^1$ is supported in the annular channel $a^3$ of the cylinder, so that the sleeve is supported both at the centre and at the ends, both ends $a^3$ of the sleeve being rebated.

To reduce the friction between the sleeve and cylinder oil under pressure can be forced between the surfaces, the oil entering through the channels $a^4$ shown in Figures 1 and 3 and passing preferably through narrow spiral or other conveniently formed oil channels in the outer surface of the sleeve or the inner surface of the cylinder against which the sleeve slides.

The rotating sleeve construction is applicable both to four stroke and to six stroke engines and to engines employing any type of fuel.

What I claim and desire to secure by Letters Patent of the United States is:—

1. In an internal combustion engine, an engine cylinder having inlet and exhaust ports, a continuously driven rotatable valve sleeve within said cylinder, having a controlling port adapted to register successively with the said inlet and exhaust ports, and a non-rotatable reciprocating piston provided with a deep cylindrical cup portion having longitudinal ports corresponding in position to the said inlet and exhaust ports of the cylinder, for the purpose specified.

2. In an internal combustion engine, a plurality of engine cylinders each provided with inlet and exhaust ports, a continuously rotatable sleeve within each cylinder provided with a port adapted during rotation to register in succession with the inlet and exhaust cylinder ports, engine driven means for rotating the said sleeves and a non-rotatable reciprocating piston within each cylinder provided with a cylindrical cup portion having ports corresponding to the inlet and exhaust ports of the cylinder, said piston being encircled by the rotatable, valve sleeve, for the purpose specified.

3. In an internal combustion engine, an engine cylinder having inlet and exhaust ports, a continuously driven rotatable valve sleeve within said cylinder, having a controlling port adapted to register successively with the said inlet and exhaust ports, and a non-rotatable reciprocating piston provided with a deep cylindrical cup portion having deep longitudinal slots corresponding in position to the inlet and exhaust ports of the cylinder and adapted to open these ports in succession to the cylinder through the port of the rotatable sleeve during substantially the whole of a stroke of the piston, said piston being encircled by the rotatable, valve sleeve.

4. In an internal combustion engine, an engine cylinder having inlet and exhaust ports, a continuously driven rotatable valve sleeve within the said cylinder, provided with a port adapted to register with the cylinder ports during rotation, a non-rotatable reciprocating piston having a cylindrical cup portion with longitudinal ports corresponding in position to the inlet and exhaust ports of the cylinder and a cylinder head extending to a considerable depth into the cylinder, leaving a clearance which forms a narrow annular channel into which the cylindrical cup portion of the piston extends during its stroke, said piston being encircled by the rotatable, valve sleeve, for the purpose specified.

5. In an internal combustion engine, an engine cylinder provided with inlet and exhaust ports and an auxiliary exhaust port towards the outer end of the working space, a continuously driven rotatable valve sleeve in the said cylinder provided with ports adapted to register with the cylinder ports and a non-rotatable reciprocating piston having a cylindrical cup portion with longitudinal ports corresponding in position to the said cylinder ports, said piston being encircled by the rotatable, valve sleeve, for the purpose specified.

HORACE JAMES POCOCK.